US012540724B1

(12) United States Patent
Chen et al.

(10) Patent No.: US 12,540,724 B1
(45) Date of Patent: Feb. 3, 2026

(54) LIGHT EMITTING DEVICE WITH ADJUSTABLE OPTICAL ANGLE AND LAMP

(71) Applicant: Xiamen Guangpu Electronics, Ltd., Xiamen (CN)

(72) Inventors: Jiexuan Chen, Xiamen (CN); Zhifu Xie, Xiamen (CN); Yuxi Chen, Xiamen (CN); Haiding Su, Xiamen (CN); Guobiao Lin, Xiamen (CN)

(73) Assignee: Xiamen Guangpu Electronics, Ltd., Xiamen (CN)

( * ) Notice: Subject to any disclaimer, the term of this patent is extended or adjusted under 35 U.S.C. 154(b) by 0 days.

(21) Appl. No.: 19/046,679

(22) Filed: Feb. 6, 2025

(30) Foreign Application Priority Data

Nov. 7, 2024 (CN) ......................... 202422709906.2

(51) Int. Cl.
*F21V 14/00* (2018.01)
*F21S 8/04* (2006.01)
*F21V 21/30* (2006.01)
*F21Y 105/00* (2016.01)

(52) U.S. Cl.
CPC ................ *F21V 21/30* (2013.01); *F21S 8/04* (2013.01); *F21V 14/00* (2013.01); *F21Y 2105/00* (2013.01)

(58) Field of Classification Search
CPC .......... F21V 14/02; F21V 14/06; F21V 14/00; F21V 5/007; F21V 21/008; F21S 8/06; F21S 8/04; F21Y 2105/00; F21Y 2105/10
See application file for complete search history.

(56) References Cited

U.S. PATENT DOCUMENTS 10,837,623 B1 * 11/2020 Tsao ......................... F21V 14/02
2013/0170222 A1 * 7/2013 Lin ......................... F21V 14/06
362/308
2022/0090764 A1 * 3/2022 Seronveaux .......... F21V 23/004

FOREIGN PATENT DOCUMENTS

KR 20200023579 A * 3/2020 ................ F21V 9/40
WO WO-2010006614 A1 * 1/2010 .............. F21V 14/06

OTHER PUBLICATIONS

Machine translation of Lee, KR-20200023579-A, published Mar. 5, 2020 (Year: 2020).*

* cited by examiner

*Primary Examiner* — William N Harris
(74) *Attorney, Agent, or Firm* — Cooper Legal Group, LLC

(57) ABSTRACT

A light emitting device with an adjustable optical angle includes a base, a light source, and a panel. One of the light source or the panel is movably mounted on the base. The light source includes a plurality of light emitting matrices. The panel includes a plurality of first transmission areas. A distance between two adjacent light emitting matrices is equal to a distance between two adjacent first transmission areas. The panel includes one or more second transmission areas respectively disposed between the two adjacent first transmission areas. The plurality of first transmission areas and the one or more second transmission areas have different transmission angles. The one of the light source or the panel is configured to be moved to enable a light emitting area of the light source to be located to correspond to the plurality of first transmission areas or the one or more second transmission areas.

10 Claims, 6 Drawing Sheets

LIGHT EMITTING DEVICE WITH ADJUSTABLE OPTICAL ANGLE AND LAMP

RELATED APPLICATIONS

This application claims priority to Chinese patent application number 202422709906.2, filed on Nov. 7, 2024. Chinese patent application number 202422709906.2 is incorporated herein by reference.

FIELD OF THE DISCLOSURE

The present disclosure relates to the technical field of lighting devices and in particular to a light emitting device with an adjustable optical angle and a lamp.

BACKGROUND OF THE DISCLOSURE

By incorporating lenses within lighting fixtures, luminous devices can achieve different light emission effects. Typically, the lenses inside the lighting fixtures are fixed and lack the functionality to adjust the transmission angle. If other light emission effects are required, it is necessary to replace the fixture with one that has lenses featuring different transmission angles. This not only prolongs the installation process but also requires users to purchase multiple fixtures, adversely affecting the user experience.

BRIEF SUMMARY OF THE DISCLOSURE

The purpose of the present disclosure is to provide a light emitting device with an adjustable optical angle and a lamp, enabling multiple transmission angles within a single light emitting device. This reduces the need for users to purchase multiple lighting fixtures, thereby improving the user experience.

To achieve the above purpose, the present disclosure provides the following technical solution.

A light emitting device with an adjustable optical angle comprises a base, a light source, and a panel. One of the light source or the panel is movably mounted on the base, and the light source comprises a plurality of light emitting matrices arranged at equal intervals. The panel comprises a plurality of first transmission areas arranged at equal intervals, and a distance between two adjacent light emitting matrices of the plurality of light emitting matrices is equal to a distance between two adjacent first transmission areas of the plurality of first transmission areas. The panel comprises one or more second transmission areas respectively disposed between the two adjacent first transmission areas of the plurality of first transmission areas. The plurality of first transmission areas and the one or more second transmission areas have different transmission angles, and the one of the light source or the panel is configured to be moved to enable a light emitting area of the light source to be located to alternatively correspond to the plurality of first transmission areas or the one or more second transmission areas.

Furthermore, the light emitting device comprises a seat. The seat is connected to the base, and the seat comprises a guiding groove. A movable switching rod is disposed in the guiding groove, and the movable switching rod is connected to the one of the light source or the panel that is configured to be moved. The movable switching rod has a first position at which the light emitting area of the light source is switched to correspond to the plurality of first transmission areas and a second position at which the light emitting area of the light source is switched to correspond to the one or more second transmission areas.

Furthermore, the light emitting device comprises a fixed member. The fixed member is connected to the one of the light source or the panel that is configured to be moved, and the seat comprises a first fixing position and a second fixing position. When the movable switching rod is located at the first position, the fixed member is detachably connected to the first fixing position. When the movable switching rod is located at the second position, the fixed member is detachably connected to the second fixing position.

Furthermore, an end of the fixed member that is detachably connected to the first fixing position and the second fixing position is disposed with an elastic buckle, and the first fixing position and the second fixing position are buckle grooves configured to be matched with the elastic buckle.

Furthermore, a distance between two ends of the guiding groove is equal to a distance between the first fixing position and the second fixing position.

Furthermore, the seat comprises transmission angle marks corresponding to the plurality of first transmission areas and the one or more second transmission areas.

Furthermore, the base comprises a mounting cavity. The light source is fixedly connected in the mounting cavity, and the panel is movably mounted on an opening of the mounting cavity.

Furthermore, two opposite sides of the opening of the mounting cavity comprises sliding grooves, and two sides of the panel are movably disposed in the sliding grooves.

Furthermore, the base is disposed with a heat sink.

A lamp comprises a hanging frame and the light emitting device with the adjustable optical angle.

Compared with the existing techniques, the technical solution has the following advantages.

1. The present disclosure proposes the light emitting device with the adjustable optical angle comprising the base, and the light source and the panel are disposed in the base. The one of the light source or the panel is movably mounted on the base. The light source comprises the plurality of light emitting matrices arranged at equal intervals, and the panel comprises the plurality of first transmission areas arranged at equal intervals. The distance between the two adjacent light emitting matrices is equal to the distance between the two adjacent first transmission areas. The panel comprises the one or more second transmission areas respectively disposed between the two adjacent first transmission areas. The plurality of first transmission areas and the one or more second transmission areas have different transmission angles, so that the light emitting device has a plurality of transmission angles. The user moves the light source or the panel so that the light emitting area of the light source is located to correspond to the plurality of first transmission areas or the one or more second transmission areas, thereby reducing a need for the user to purchase multiple lamps and improving the user experience.
2. The present disclosure proposes the light emitting device with the adjustable optical angle, comprising the fixed member. When the movable switching rod is located at the first position or the second position, the fixed member can be detachably connected to the first fixing position and the second fixing position respectively, so as to ensure that the panel or the light source remains stationary at the current position and stabilize a light output angle.

3. The present disclosure proposes the light emitting device with the adjustable optical angle. The distance between the two ends of the guiding groove is equal to the distance between the first fixing position and the second fixing position, so that when the movable switching rod abuts a first end or a second end of the guiding groove, the fixed member is automatically connected to the first fixing position or the second fixing position.
4. The present disclosure proposes the light emitting device with the adjustable optical angle. The seat is provided with transmission angle markings corresponding to the plurality of first transmission areas and the one or more second transmission area, so that the user can observe the current transmission angle.

BRIEF DESCRIPTION OF THE DRAWINGS

In order to more clearly illustrate the embodiments of the present disclosure or the technical solutions in the existing techniques, the drawings required for use in the embodiments or the description of the existing techniques will be briefly introduced below. Obviously, the drawings described below are only some embodiments of the present disclosure. For ordinary technicians in this field, other drawings can be obtained based on these drawings without paying creative work.

Figure 1:
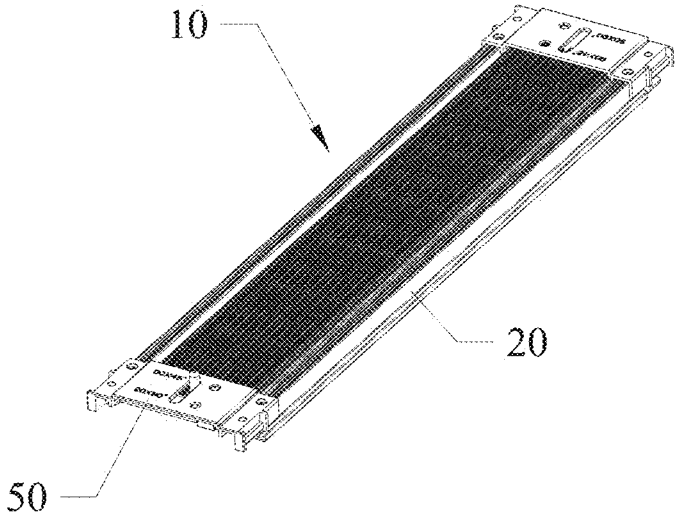
FIG. 1 is a schematic diagram of a light emitting device of the present disclosure.
Figure 2:
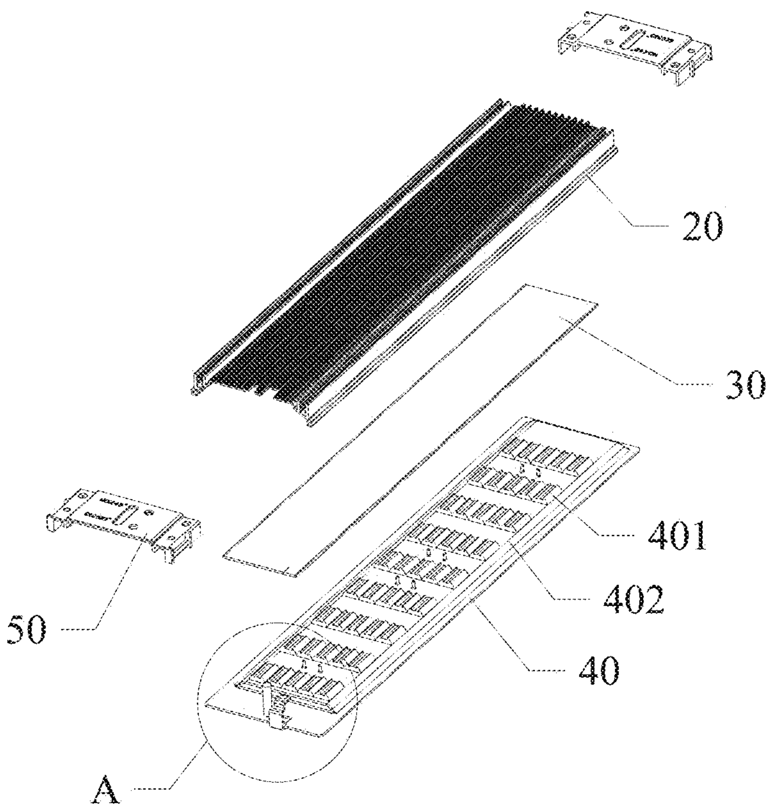
FIG. 2 is an exploded view of the light emitting device of the present disclosure.

In the figure, 10—light emitting device; 20—base; 201—mounting cavity; 202—sliding groove; 203—heat sink; 30—light source; 301—light emitting matrix; 40—panel; 401—first transmission area; 402—second transmission area; 50—seat; 501—guiding groove; 5021—first fixing position; 5022—second fixing position; 503—transmission angle mark; 60—movable switching rod; 70—fixed member; 701—elastic buckle; 702—protruding member; 80—lamp; 90—hanging frame; 100—load-bearing rod; 110—hanging chain.

DETAILED DESCRIPTION OF THE EMBODIMENTS

Embodiment 1

The present disclosure is described in detail below with reference to FIGS. 1-10.

This embodiment provides a light emitting device 10 with an adjustable optical angle, and the light emitting device 10 comprises a base 20, a light source 30, and a panel 40. One of the light source 30 or the panel 40 is movably mounted on the base 20. The panel 40 comprises a plurality of transmission areas with different lens angles, and the light source 30 or the panel 40 is moved so that a light emitting area of the light source 30 is located to correspond to a specific transmission area of the plurality of transmission areas. Further, the light source 30 comprises a plurality of light emitting matrices 301 arranged at equal intervals. The panel 40 comprises a plurality of first transmission areas 401 arranged at equal intervals, and a distance between two adjacent light emitting matrices 301 of the plurality of light emitting matrices 301 is equal to a distance between two adjacent first transmission areas 401 of the plurality of first transmission areas 401. The panel 40 comprises one or more second transmission areas 402 respectively disposed between the two adjacent first transmission areas 401 of the plurality of first transmission areas 401 (i.e., the plurality of first transmission areas 401 and the one or more second transmission areas 402 are arranged alternately). The plurality of first transmission areas 401 and the one or more second transmission areas 402 have different transmission angles, so that the light emitting device 10 has a plurality of transmission angles. The user moves the light source 30 or the panel 40 so that the light emitting area of the light source 30 is located to correspond to the plurality of first transmission areas 401 or the one or more second transmission areas 402, thereby reducing a need for the user to purchase multiple lamps and improving the user experience. A transmission angle of the plurality of first transmission areas 401 is 90×45°, and a transmission angle of the one or more second transmission areas 402 is 90×90°.

Figure 6:
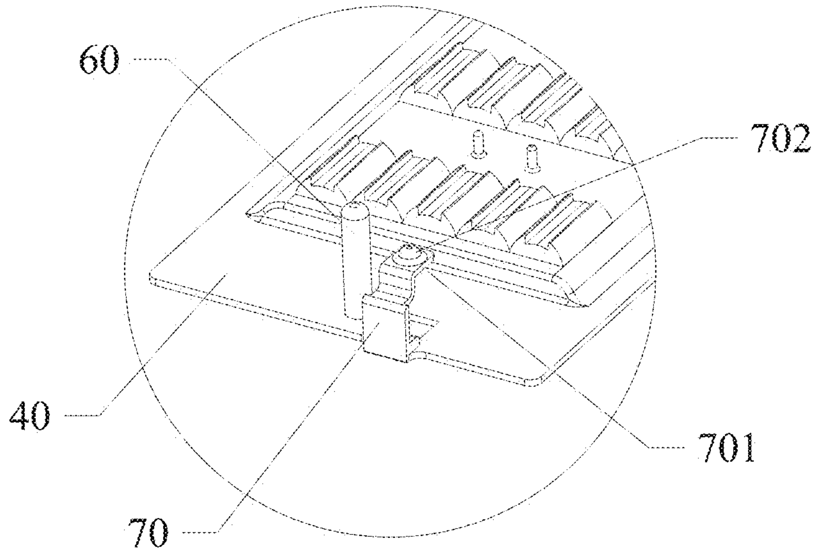
FIG. 6 is a schematic diagram of a movable switching rod and a fixed member of the light emitting device of the present disclosure.
Figure 7:
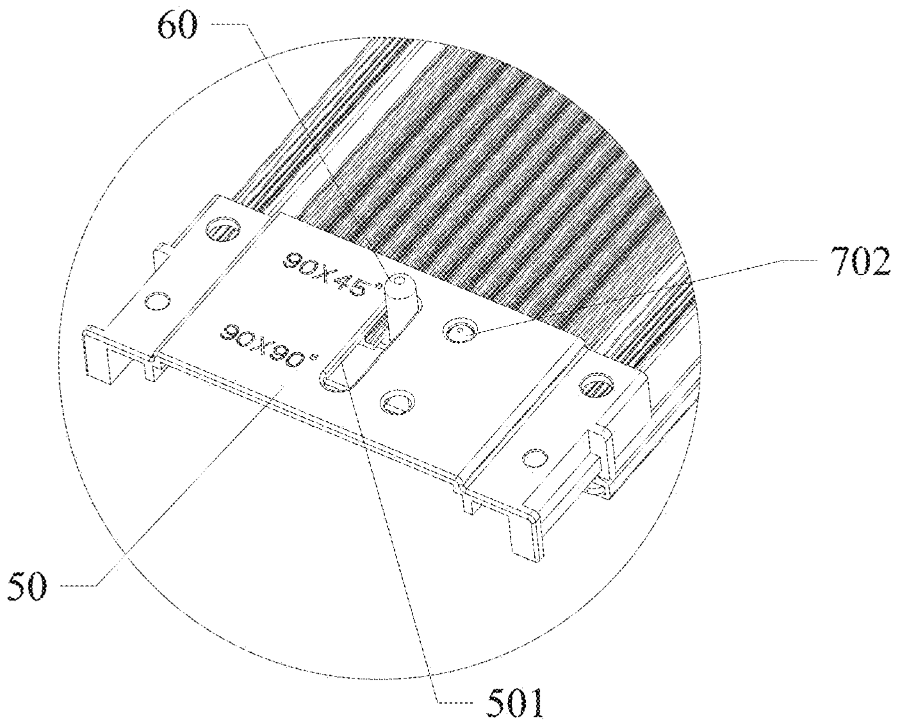
FIG. 7 is a schematic diagram of the movable switching rod of the light emitting device of the present disclosure when the movable switching rod is in a first position.
Figure 8:
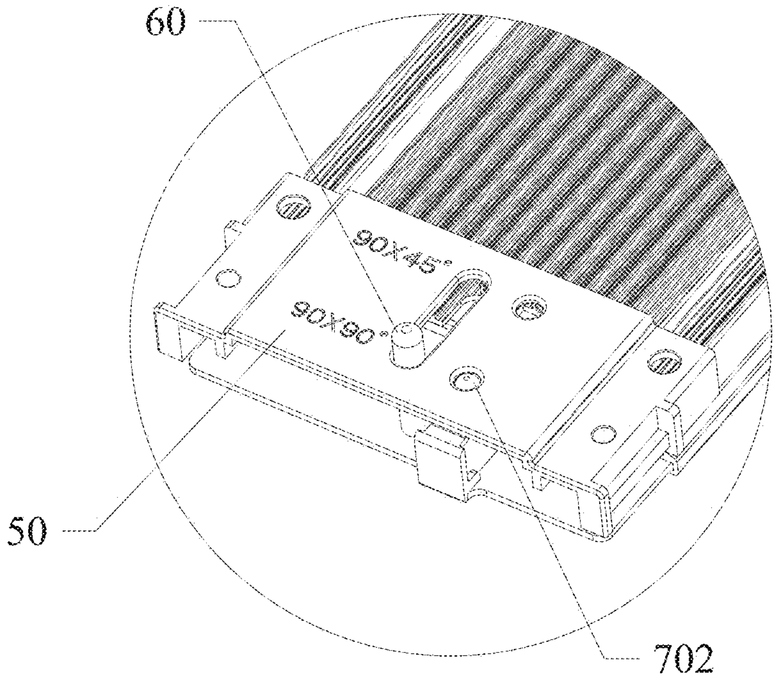
FIG. 8 is a schematic diagram of the movable switching rod of the light emitting device of the present disclosure when the movable switching rod is in a second position.
Figure 9:
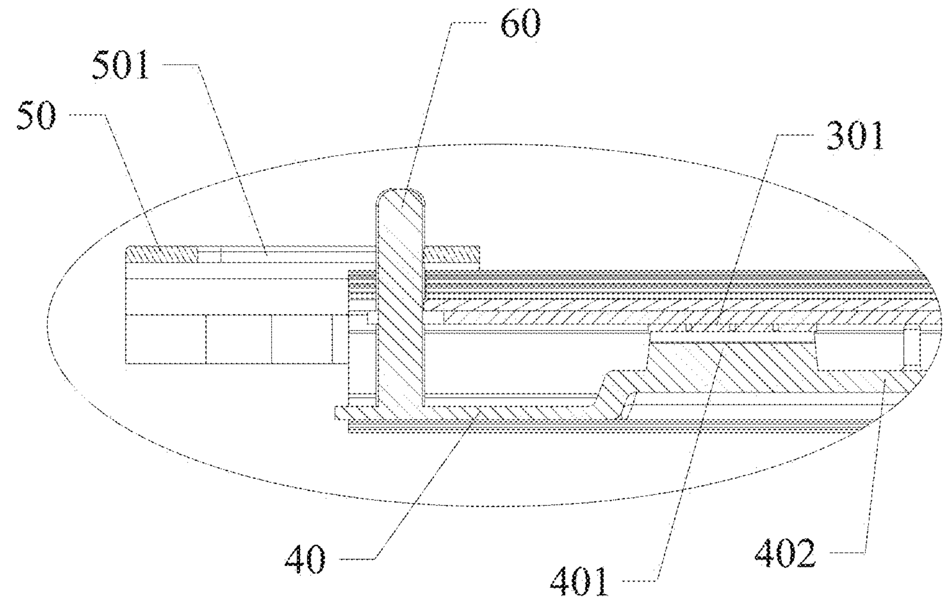
FIG. 9 is a schematic diagram of the present disclosure when the light source of the light emitting device corresponds to a first transmission area.
Figure 10:
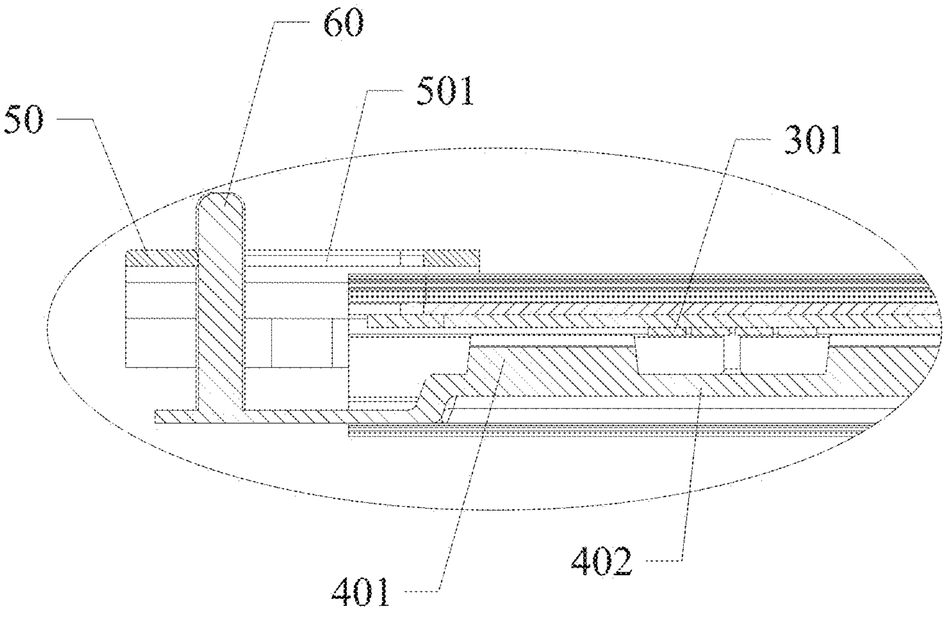
FIG. 10 is a schematic diagram of the present disclosure when the light source of the light emitting device corresponds to a second transmission area.

In this embodiment, the light emitting device 10 comprises a seat 50, and the seat 50 is connected to the base 20. As shown in FIGS. 6 to 8, the seat 50 comprises a guiding groove 501, and a movable switching rod 60 is disposed in the guiding groove 501. The movable switching rod 60 is connected to the one of the light source 30 or the panel 40 that can be moved. The movable switching rod 60 has a first position at which the light emitting area of the light source 30 is switched to correspond to the plurality of first transmission areas 401 and a second position at which the light emitting area of the light source 30 is switched to correspond to the one or more second transmission areas 402.

In this embodiment, as shown in FIGS. 6-8, the light emitting device 10 further comprises a fixed member 70, and the fixed member 70 is connected to the one of the light source 30 or the panel 40 that can be moved. The seat 50 comprises a first fixing position 5021 and a second fixing position 5022. When the movable switching rod 60 is located at the first position, the fixed member 70 is detachably connected to the first fixing position 5021. When the movable switching rod 60 is located at the second position, the fixed member 70 is detachably connected to the second fixing position 5022.

In this embodiment, an end of the fixed member 70 that is detachably connected to the first fixing position 5021 and the second fixing position 5022 is disposed with an elastic buckle 701. The first fixing position 5021 and the second fixing position 5022 are buckle grooves configured to be matched with the elastic buckle 701. Furthermore, the elastic buckle 701 comprises a protruding member 702 protruding from a surface of the elastic buckle 701 and configured to be matched with the buckle grooves. In the embodiment, a magnetic attraction structure can also be used between the fixed member 70, the first fixing position 5021, and the second fixing position 5022.

In this embodiment, a distance between two ends of the guiding groove 501 is equal to a distance between the first fixing position 5021 and the second fixing position 5022, so that when the movable switching rod 60 abuts a first end or a second end of the guiding groove 501, the fixed member 70 is automatically connected to the first fixing position 5021 or the second fixing position 5022.

In this embodiment, the seat 50 comprises transmission angle marks 503 corresponding to the plurality of first transmission areas 401 and the one or more second transmission areas 402, so as to facilitate the user observing the current transmission angle.

Figure 3:
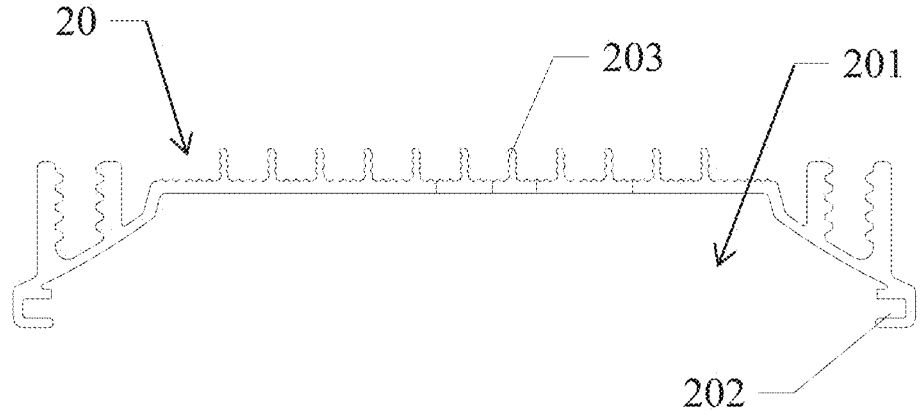
FIG. 3 is a schematic diagram of a base of the light emitting device of the present disclosure.
Figure 4:
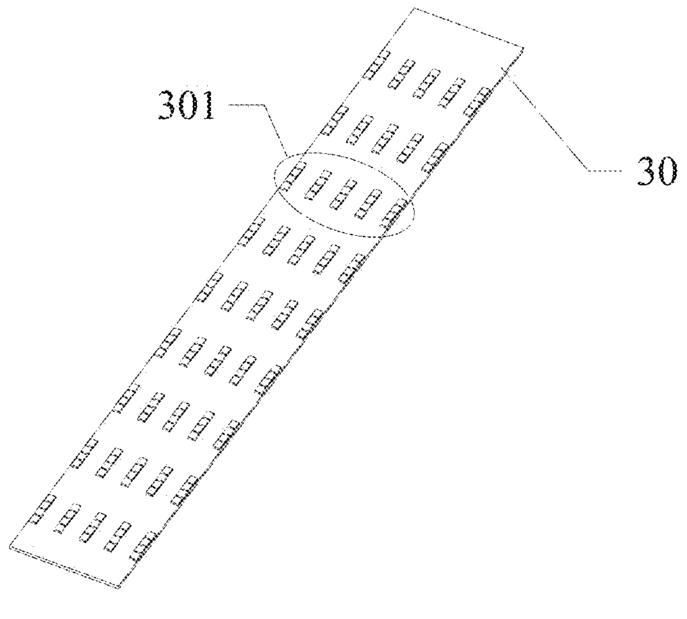
FIG. 4 is a schematic diagram of a light source of the light emitting device of the present disclosure.
Figure 5:
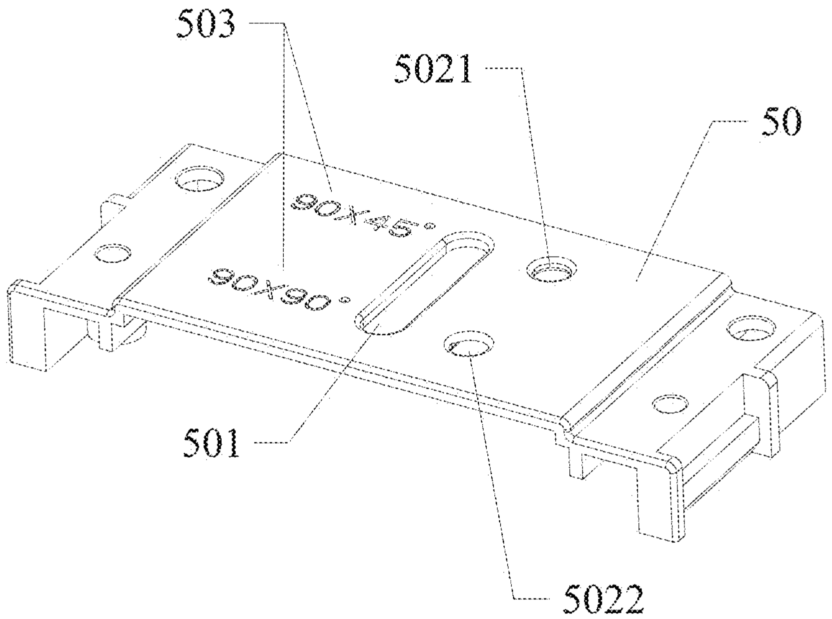
FIG. 5 is a schematic diagram of a seat of the light emitting device of the present disclosure.

In this embodiment, as shown in FIG. 3, the base 20 comprises a mounting cavity 201, the light source 30 is fixedly connected in the mounting cavity 201, and the panel 40 is movably mounted on an opening of the mounting cavity 201. Further, two opposite sides of the opening of the mounting cavity 201 comprise sliding grooves 202. Two sides of the panel 40 are movably disposed in the sliding grooves 202, and the base 20 is disposed with a heat sink 203 for reducing a heat emitted by the light source 30 when working.

Embodiment 2

Figure 11:
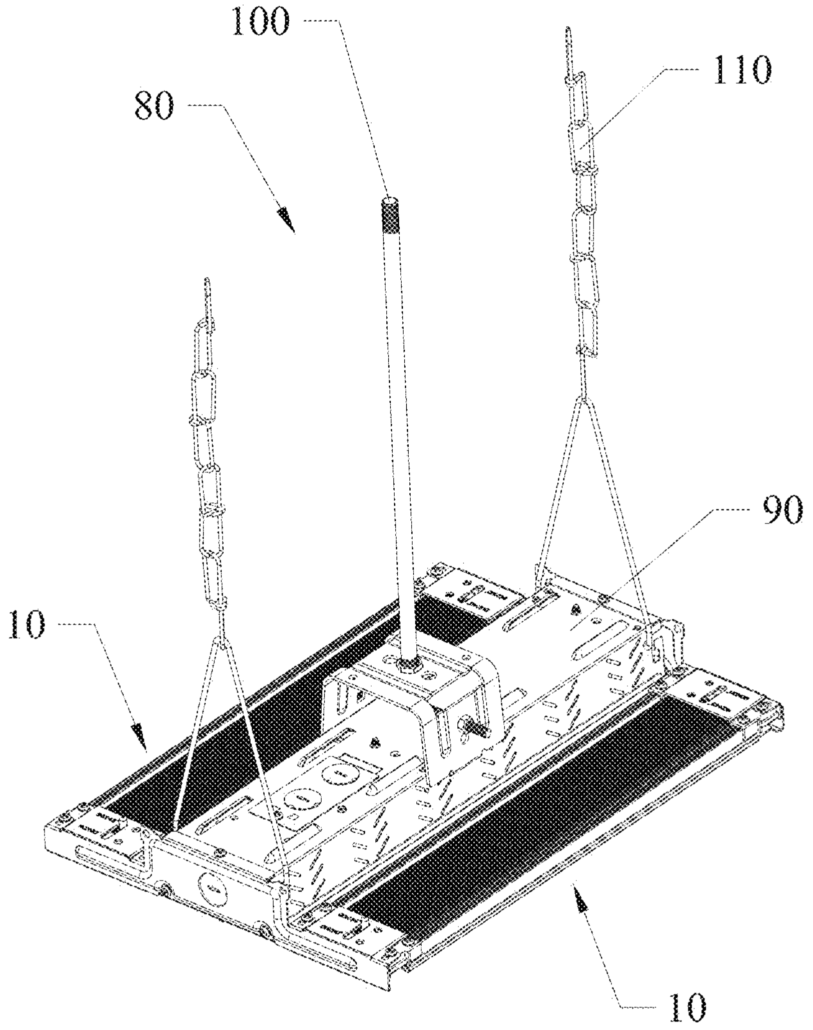
FIG. 11 is a schematic diagram of a lamp of the present disclosure.

This embodiment further provides a lamp 80, as shown in FIG. 11. The lamp comprises a hanging frame 90, and the light emitting device 10 and a second light emitting device with the adjustable optical angle are connected to two sides of the hanging frame 90. Furthermore, the hanging frame 90 further comprises a load-bearing rod 100 and a hanging chain 110.

The above embodiments are only for illustrating the technical concept and features of the present disclosure, and a purpose is to enable those skilled in the art to understand the content of the present disclosure and implement it. The above embodiment should not be used to limit the protection scope of the present disclosure. Any equivalent changes or modifications made according to the spirit of the present disclosure should be included in the protection scope of the present disclosure.

What is claimed is:

1. A light emitting device with an adjustable optical angle, comprising:
- a base,
- a light source, and
- a panel, wherein:
  - one of the light source or the panel is movably mounted on the base,
  - the light source comprises a plurality of light emitting matrices arranged at equal intervals,
  - the panel comprises a plurality of first transmission areas arranged at equal intervals,
  - a distance between two adjacent light emitting matrices of the plurality of light emitting matrices is equal to a distance between two adjacent first transmission areas of the plurality of first transmission areas,
  - the panel comprises one or more second transmission areas respectively disposed between the two adjacent first transmission areas of the plurality of first transmission areas,
  - the plurality of first transmission areas and the one or more second transmission areas have different transmission angles, and
  - the one of the light source or the panel is configured to be moved to enable a light emitting area of the light source to be located to alternatively correspond to the plurality of first transmission areas or the one or more second transmission areas.

2. The light emitting device with the adjustable optical angle according to claim 1, comprising:
- a seat, wherein:
  - the seat is connected to the base,
  - the seat comprises a guiding groove,
  - a movable switching rod is disposed in the guiding groove,
  - the movable switching rod is connected to the one of the light source or the panel that is configured to be moved, and
  - the movable switching rod has a first position at which the light emitting area of the light source is switched to correspond to the plurality of first transmission areas and a second position at which the light emitting area of the light source is switched to correspond to the one or more second transmission areas.

3. The light emitting device with the adjustable optical angle according to claim 2, comprising:
- a fixed member, wherein:
  - the fixed member is connected to the one of the light source or the panel that is configured to be moved,
  - the seat comprises a first fixing position and a second fixing position,
  - when the movable switching rod is located at the first position, the fixed member is detachably connected to the first fixing position, and
  - when the movable switching rod is located at the second position, the fixed member is detachably connected to the second fixing position.

4. The light emitting device with the adjustable optical angle according to claim 3, wherein:
- an end of the fixed member that is detachably connected to the first fixing position and the second fixing position is disposed with an elastic buckle, and
- the first fixing position and the second fixing position are buckle grooves configured to be matched with the elastic buckle.

5. The light emitting device with the adjustable optical angle according to claim 3, wherein:
- a distance between two ends of the guiding groove is equal to a distance between the first fixing position and the second fixing position.

6. The light emitting device with the adjustable optical angle according to claim 2, wherein:
- the seat comprises transmission angle marks corresponding to the plurality of first transmission areas and the one or more second transmission areas.

7. The light emitting device with the adjustable optical angle according to claim 1, wherein:
- the base comprises a mounting cavity,
- the light source is fixedly connected in the mounting cavity, and
- the panel is movably mounted on an opening of the mounting cavity.

8. The light emitting device with the adjustable optical angle according to claim 7, wherein:

two opposite sides of the opening of the mounting cavity comprises sliding grooves, and two sides of the panel are movably disposed in the sliding grooves.

9. The light emitting device with the adjustable optical angle according to claim 7, wherein:

the base is disposed with a heat sink.

10. A lamp, comprising:

a hanging frame, and the light emitting device with the adjustable optical angle according to claim 1.

* * * * *